US006542888B2

(12) United States Patent
Marques

(10) Patent No.: US 6,542,888 B2
(45) Date of Patent: Apr. 1, 2003

(54) CONTENT FILTERING FOR ELECTRONIC DOCUMENTS GENERATED IN MULTIPLE FOREIGN LANGUAGES

(75) Inventor: Joaquin M. Marques, Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/980,075

(22) Filed: Nov. 26, 1997

(65) Prior Publication Data

US 2001/0013047 A1 Aug. 9, 2001

(51) Int. Cl.[7] .......................... G06F 17/30; G06F 17/28
(52) U.S. Cl. ...................... 707/5; 707/501.1; 707/531; 707/536; 704/9; 704/10
(58) Field of Search ............................ 707/536, 1, 5, 707/8, 9, 531, 501, 513, 501.1; 364/900; 704/9, 10

(56) References Cited

U.S. PATENT DOCUMENTS

| | | | | |
|---|---|---|---|---|
| 4,974,191 A | * | 11/1990 | Amirghodsi et al. | 364/900 |
| 5,127,748 A | * | 7/1992 | Okimoto et al. | 400/70 |
| 5,148,541 A | * | 9/1992 | Lee et al. | 707/2 |
| 5,257,186 A | * | 10/1993 | Ukita et al. | 707/531 |
| 5,442,782 A | * | 8/1995 | Malatesta et al. | 707/4 |
| 5,526,443 A | * | 6/1996 | Nakayama | 382/229 |
| 5,774,888 A | * | 6/1998 | Light | 707/1 |
| 5,778,363 A | * | 7/1998 | Light | 707/5 |
| 5,787,386 A | * | 7/1998 | Kaplan et al. | 704/8 |
| 5,813,019 A | * | 9/1998 | Van De Vanter | 707/512 |
| 5,819,258 A | * | 10/1998 | Vaithyanathan et al. | 707/2 |
| 5,832,470 A | * | 11/1998 | Morita et al. | 707/1 |
| 5,835,905 A | * | 11/1998 | Pirolli et al. | 707/3 |
| 5,867,799 A | * | 2/1999 | Lang et al. | 707/1 |
| 5,890,103 A | * | 3/1999 | Carus | 704/9 |
| 5,895,470 A | * | 4/1999 | Pirolli et al. | 707/102 |
| 5,909,510 A | * | 6/1999 | Nakayama | 382/229 |
| 5,924,090 A | * | 7/1999 | Krellenstein | 707/5 |
| 5,940,821 A | * | 8/1999 | Wical | 707/3 |
| 5,956,740 A | * | 9/1999 | Nosohara | 707/536 |
| 5,966,685 A | * | 10/1999 | Flanagan | 704/8 |
| 5,995,920 A | * | 11/1999 | Carbonell et al. | 704/9 |
| 6,006,221 A | * | 12/1999 | Liddy et al. | 707/5 |
| 6,064,951 A | * | 5/2000 | Park et al. | 704/8 |
| 6,216,102 B1 | * | 4/2001 | Martino et al. | 704/1 |

OTHER PUBLICATIONS

Hull, David A. and Grefenstette, Gregory, "Querying Across Languages: A Dictionary–Based Approach to Multilingual Information Retrieval", ACM Press, New York, NY, USA, ISBN: 0–89791–792–8, pp. 49–57.*

Croft, W. Bruce, Broglio, John, and Fujii, Hideo, Applications of Multilingual Text Retrieval, IEEE, vol. 5, pp. 98–106, Jan. 3–6, 1996.*

Lin, Chung–hsin and Chen, Hsinchun, "An Automatic Indexing and Neural Network Approach to Concept Retrieval and Classification of Multilingual (Chinese–English) Documents," IEEE, vol. 26, issue 1, pp. 75–87, Feb. 1996.*

* cited by examiner

Primary Examiner—Hani M. Kazimi
Assistant Examiner—Ella Colbert
(74) Attorney, Agent, or Firm—David M. Shofi; Anne Vachon Dougherty

(57) ABSTRACT

A system for collecting and categorizing metadata about content provided via the internet or intranet, regardless of the language of generation of the content. The content of each document is assigned token IDs, which token IDs are the same for any given topic irrespective of the language in which the document is written. Filtering of single language documents will generate a single output; whereas, multilingual documents will be divided into language segments with each segment being filtered by the appropriate language filter.

13 Claims, 2 Drawing Sheets

CONTENT FILTERING FOR ELECTRONIC DOCUMENTS GENERATED IN MULTIPLE FOREIGN LANGUAGES

FIELD OF THE INVENTION

This invention relates to the field of electronic content provision. More specifically, it relates to gathering related content from internet and intranet sources and providing access to same in response to user requests.

BACKGROUND OF THE INVENTION

A huge quantity of information is being continuously created and made available via electronic communications systems. There is so much information that it is simply not possible for an individual person to read it all. On the other hand, it is imperative that certain items of information reach certain people. Much of the electronically-provided news information ages rapidly, such that it loses its relevancy in a matter of days, or even a matter of hours (e.g., stock market information). Each person has different needs for information, and requires access to a different subset of the available information. In light of the foregoing, there is clearly a need for a system and method for rapidly accessing categorized electronic information.

One difficulty in providing the information is that the information is being created in many different places. News articles about events in the world or business community, and articles written for newspapers, magazines and journals, can generally be obtained through various content providers, who frequently aggregate the information from a number of sources into single continuous electronic streams. No content provider today, however, provides access to all available information, so there is a trade-off between full access and complexity. Moreover, an individual user is frequently forced to subscribe to a host of services in order to obtain the information which is generated from different sources, in different countries, and in various languages. Subscribing to many services to some extent negates the benefits realized by the content aggregation by providers, since the user must then often filter through multiple copies of the same documents.

Internally, organizations face similar issues. Memos, announcements, documents of various kinds, and intranet web content are created at multiple locations throughout an organization, yet are generally not readily available to all members of the organization. Therefore, the process of collecting the information from all points of origins is a key issue, along with categorization and controlled dissemination of that information.

Another aspect of the problem is the actual matching process, comprising matching the collected and categorized content with an individual user's interests. For matching to work, an individual user must be able to express a diverse set of interests, not just one interest. A language of some kind is necessary to provide a medium for this expression of the user's interest. Further, a system is needed to capture the language and apply it to the items of information. Moreover, the language must embody some kind of high level semantic knowledge, since past word-search-based systems have fallen short of a satisfactory solution. The ability to express, capture and apply a person's interests or needs is a critical feature of the problem.

Finally, there is a need to deliver the information to people who have expressed an interest. The primary requisites for delivery are making sure that access to the information is convenient, even in dynamic situations, and making sure that delivery can occur quickly once the information becomes available. Moreover, people are increasingly mobile and have varied styles of working and of accessing and processing information. An effective delivery system will therefore require that the means of access be ubiquitous, that multiple means of access be available, and that delays in making the information available be minimized.

It is therefore an objective of the present invention to provide a system for gathering, categorizing, and delivering electronic content to users in response to user requests.

It is another objective of the invention to provide a system and method for gathering content from both inside (i.e., intranet) and outside (i.e., internet) sources and categorizing same for provision in response to customized user requests.

Yet another objective of the present invention is to provide a customer with the ability to embed user interest and delivery mechanisms into customer applications.

SUMMARY OF THE INVENTION

These and other objectives are realized by the present invention which provides a system for collecting and categorizing metadata about content provided via the internet or intranet, regardless of the language of generation of the content. The content of each document is assigned token IDs, which token IDs are the same for any given topic irrespective of the language in which the document is written. Filtering of single language documents will generate a single output; whereas, multilingual documents will be divided into language segments with each segment being filtered by the appropriate language filter.

BRIEF DESCRIPTION OF THE DRAWINGS

The invention will now be further detailed with specific reference to the appended Figures wherein.

DESCRIPTION OF THE PREFERRED EMBODIMENT

Figure 1:
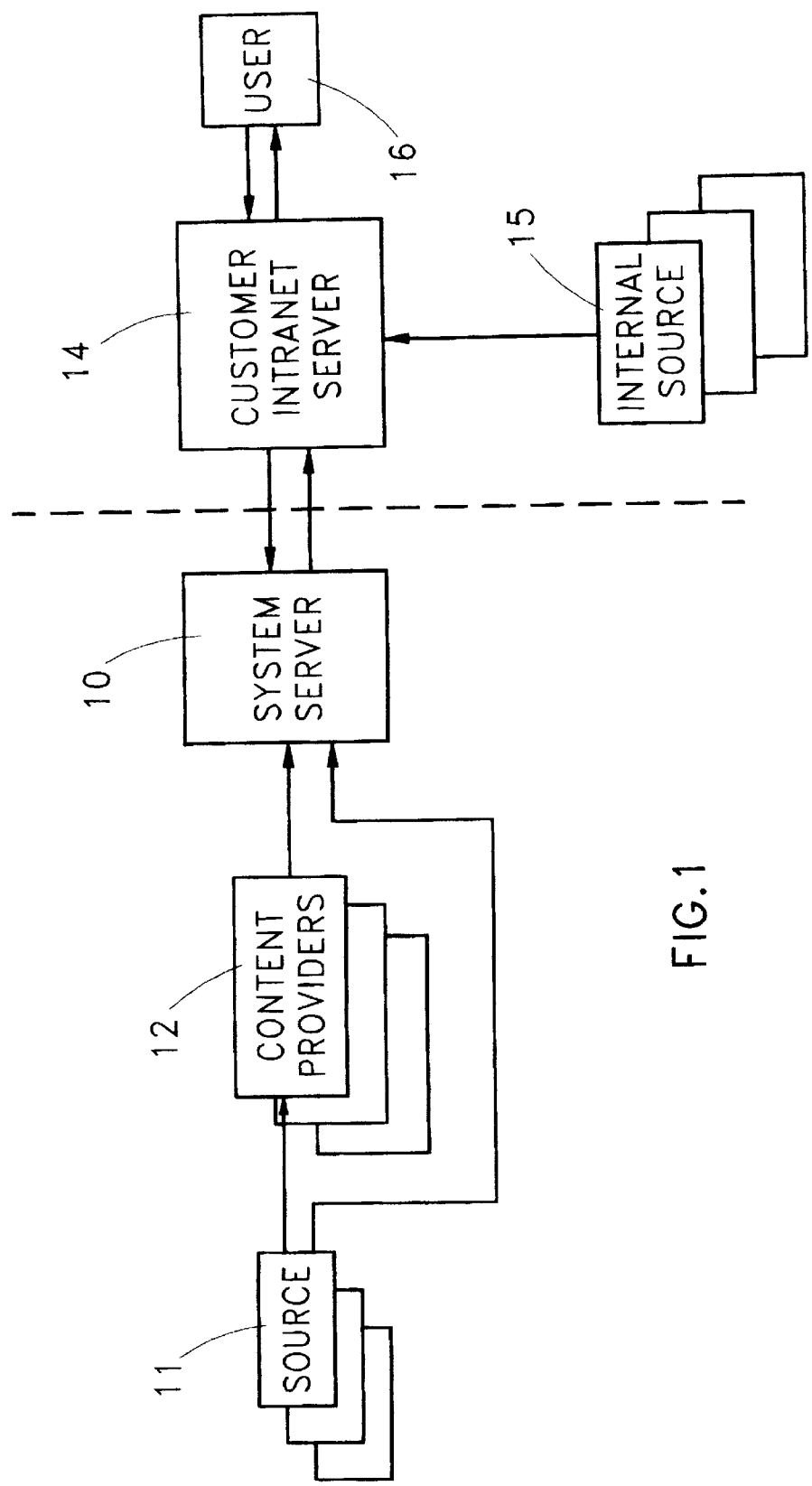
FIG. 1 provides a schematic illustration of an implementation of the present invention.

FIG. 1 provides a schematic overview of one implementation of the present invention. The implementation can be viewed as having two sides, an external side comprising the sources, content providers and System Server, and an internal side comprising the customer's site (including at least one server for the customer's intranet), internal sources and end user sites. As detailed therein, sources 11 provide electronic content (e.g., articles) on-line to content providers 12. The System Server, 10, gathers electronic content from content providers, as well as directly from sources, if necessary. At the System Server, the electronic content is categorized, with duplicate copies eliminated, and is stored in so-called "channels" of information. Each channel represents a particular category or group of categories of related information. The categorization of document content is generally done without reference to known user profiles or prejudices, although the categorization can be influenced by known or expected user query categories.

On the so-called "internal" side of the inventive system, the Customer Intranet Server 14, is in communication with not only the outside System Server, but also with internal sources 15 and at least one end user 16. The end users may be employees of the customer or clients of the customer who have contracted or otherwise arranged for receipt of information which has been accumulated, categorized, and disseminated from the Customer Intranet Server site 14.

An end user 16 will specify the areas of interest for which that end user wishes to obtain electronic information. Unlike prior art systems which allowed only minimal user query input, often limited to single word entries for simple word searching, the present system assembles a complex user query including the specification of multiple disparate topics of interest. The user profile is created by system components which are located at the Customer Intranet Server 14. "Creation" of the user profile involves, not only the extension of user-input language, but also the elimination of non-critical language, inclusion of semantic knowledge, and cross-relating of user interest topics. Query development is further detailed below.

Once the user profile has been developed, it is stored at the Customer Intranet Server for matching to assembled and categorized content. The system can be programmed to conduct on-going matching (i.e., checking every new document entry for a match with the user profile), periodic matching (e.g., every 12 hours), or matching only upon user prompting (e.g., only when a user connects to the Customer and asks for an update).

Continual or periodic categorization of external electronic content is the task of the system components which can be located at the System Server 10. The System Server receives input from the content providers 12, as well as possibly from the internal sources 15 via the Customer Intranet Server 14. Receipt of input from both external and internal sources can be a passive process, whereby the documents are continuously or periodically supplied to the System Server, or an active process, whereby system crawler components seek out the documents via word searching, site mapping, etc. The inventive system preferably includes provision to the customer site of at least one internal crawler which will provide a totally automated way to bring their entire distributed network resources into the system. The crawlers crawl through a customer's internal network and retrieve documents from various sources, distinguished by the technologies which were used to store the information.

Documents from internal sources are assembled and categorized at the Customer Intranet Server, where a Channel Map is created containing a list of web servers, directories and other targets which have been or are to be crawled. Channel maps may also be constructed at the System Server as well. Each entry in the Channel Map may include a list of channels in which web pages from the respective server and directory are to appear. Table 1 provides a sample Channel Map for a fictitious semiconductor manufacturer:

| TYPE   | SERVER        | DIRECTORY              | CHANNELS          |
|--------|---------------|------------------------|-------------------|
| Web    | HR            | /publish/benefits/401k | 401k              |
| Web    | HR            | /publish/jobopenings   | Jobs              |
| Web    | Marketing     | /publish/product/specs | Product Specs     |
| Web    | www.badco.com | /pub/productspecs      | Competition Specs |
| Web    | www.goodco.com| /pub/products/electrnic| Customer Products |
| PCFile | engineering   | /projects/chipdesigns  | Chip Designs      |
| PCFile | marketing     | /reports/companalysis  | Competitive Anly. |
| FTP    | engineering   | /projects/status       | Status Reports    |
| Notes  | engineering   | /specs/chipspeed       | A1200 Design      |

Figure 2:
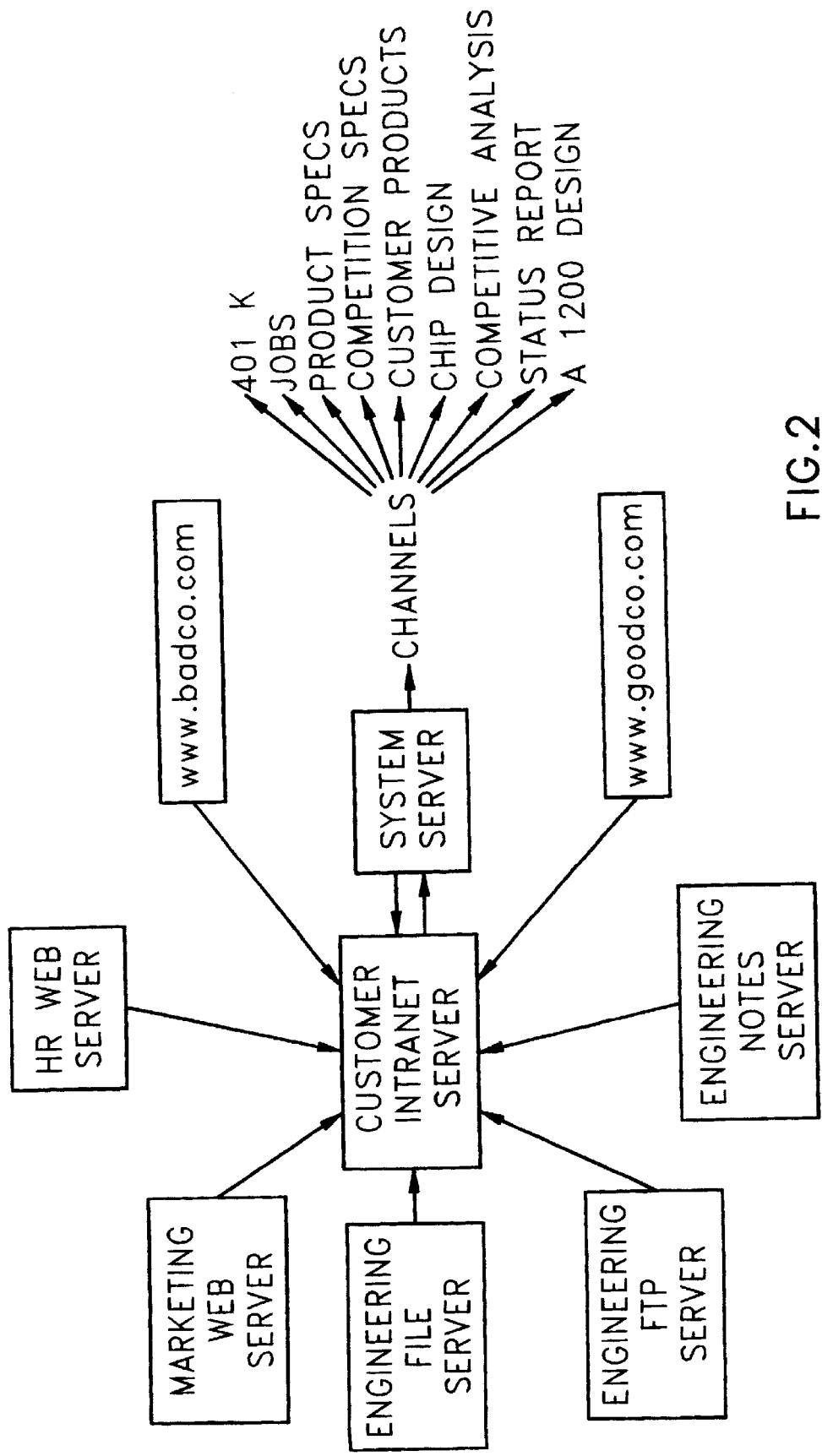
FIG. 2 provides a schematic illustration of the intranet side of one embodiment of the inventive system.

FIG. 2 provides a schematic illustration of the sources accessible to the Customer Intranet Server of the fictitious company, directly or through the System Server, and the channels that result from receiving or crawling those sources. Information gathered from external sources will also be mapped to the established channels, so that an end user can readily access all relevant information in a category or channel as the result of a single query.

While some amount of categorization may be straightforward, such as those above-noted examples wherein any information obtained from a certain source will necessarily be provided on a given channel (i.e., with sites or site directories being mapped to the channels), the bulk of document categorization requires intensive analysis of the document contents. In addition to the crawlers which automatically funnel documents obtained from certain sources into pre-established channels, there are two other primary means by which documents are categorized. The first, and most rudimentary, is categorization by manual user interface, whereby a system administrator (or even document author) identifies the document to be loaded into the server and identifies the channels in which the document is to appear. The second, more complex, means is automatic categorization by content filtering, which is conducted by system components located at either the Customer Intranet Server or the System Server 10, the details of which are further provided below and in the co-pending application, Ser. No. 08/979,248, abandoned entitled "Electronic Document Content Filtering", which is assigned to the present assignee, and is being filed on even date herewith. Such automatic categorization can also be utilized at the Customer Intranet Server for the purpose of categorizing internal documents into channels which may match or be unique from the channels provided by the System Server. Such channel definitions can be applied as well to documents received from the System Server to fill customer defined channels with news or other external documents. After query processing and document content categorization, it is desirable to analyze the categories to ascertain if other relationships exist among the categories, which relationships themselves may be identified as new categories or channels. "(See Co-pending patent application, U.S. Pat. No. 6,182, 066 is entitled "category Processing of Query Topics and Electronic Document Content Topics", and, which is assigned to the present assignee, and is being filed on even date herewith. The teachings of the foregoing applications are incorporated by reference herein, as are the teachings of co-pending patent application U.S. Pat. No. 6,236,991, entitled "Method and System for Providing Access to Categorized Information from Online Internet and Intranet Sources," which is assigned to the present assignee and filed on even date herewith.

Once documents from both the internal and external sources have been categorized/assigned channels, both the documents and the assigned channels are stored in a local database at the Customer Intranet Server or associated customer location. Inventive components at the Customer Intranet Server match the channels assigned to each of the incoming documents with the user's interests as found in the user profile. Each document is then made available for access by, or is sent to, the user whose interests it matches.

The System Server's above-noted functions may be provided as part of a customer intranet, wholly outside of the customer domain, or divided in function between the two locations. In the "outside" example, all document collection and categorization would be done at the System Server as a service of the provider. Documents found on the external internet, as well as those which may be supplied from the customer's own intranet and/or databases, would be analyzed and categorized at the provider location. In the instance where the customer wishes to additionally be a provider to end users, two alternative scenarios are possible. Under the first scenario, an outside provider would still assemble and categorize documents from outside sources and make them available at the customer's server. The customer's server would also be adapted to perform assembly and categorization of "in-house" documents, merging of the in-house assemblage with the categorized documents from outside sources, matching the resultant merged documents to user request profiles, and disseminating the matching results to the user. The second alternative implementation would locate all categorization functionality at the customer location. In all three implementations, the customer location would retain the capability for receipt of user request input, creation and storage of the user profile, matching of the user profile to the categories or channels into which the documents are placed, and provision of the matched documents for end user review.

The customer site is provided with the capability for building applications to create a series of different user interfaces with different interaction means, different restrictions for user access (e.g., providing some users access to only documents from outside sources, while others would have access to both externally-obtained and internally-generated documents), and different levels of query and content complexity.

For the detailed descriptions of the processing "stages," including user query analysis and profile creation, document categorization, and matching, it is to be noted that the same types of analyses can frequently be applied at each stage. For example, finding relationships between two seemingly disparate user query subject categories can parallel the effort to identify commonality of subject matter from two input documents, as well as a subsequent effort to match the profile to a category/channel. Therefore, where appropriate, the ensuing processes will reference one, two or all of profile analysis, document content categorization, and matching stages.

Users of the system initially specify which topics are of interest. This specification takes the form of one of more of the following: selection of pre-defined user categories, modification of pre-defined user categories, or user-customized sets of queries. Each query represents a topic, and can identify a channel and additionally contain boolean, fuzzy, proximity and/or hierarchical operators. A set of topics preferred by a user is know as a user profile. The present method reduces each query to one or more vector entries with the entry's index into the vector corresponding to a hash of the queries textual expression of the importance of that query to the overall topic/profile. A query can be either a single token (word or phrase) or a combination of tokens which includes boolean, fuzzy, proximity and/or hierarchical operators. Token IDs are assigned to each query item as hereinafter detailed.

Automatic query processing, as well as document content categorization, is optimized in the present invention by first tokenizing the content thereof. In such a tokenization process, all the word/phrases are first identified as units, then stemmed. After all stop words and phrases are filtered out, only a few of the original word/phrases are left. These surviving words/phrases are called tokens. The tokens are usually just the stems of the original words, or made-up labels which correspond to phrases. The stems or made-up labels are referred to as "terms". Terms are strings, and since the system must handle quite a few thousand terms, the total memory which can be consumed by terms could take up a significant amount of computer memory. Therefore, a hash function is provided to assign unique token IDs to the terms (which may also consist of expressions containing words and phrases as terms combined with a variety of query operations) found in the documents and queries. The term strings are replaced by 32 bit integers. A "reverse dictionary" can be maintained which comprises a lexicon with token IDs as the keys and the words, phrases, queries as the values. However, if the need is to mark the document with categories, and not to catalog and retrieve based on the specific tokens matched, a lexicon will not be needed. Clearly, when comparisons are being made, comparisons of 32 bit integers will be significantly faster than the prior art string comparisons. Textual messages are likewise mapped to vectors using the same procedures as were used for the topics, above. All vectors are then normalized. Classification and matching are thereby reduced to vector processing.

Yet another challenge to providing a ubiquitous online system is the categorization and dissemination of documents which have been prepared in different languages, or which combine terms from more than one language (a so-called "multilingual" document). Rather than requiring translation of every document, and entry of user preferences/queries in every language, a common token will be assigned to the same content regardless of the language in which it is rendered. Each predefined topic/category needs to be specified by one or more topic specialists in each of the supported languages, using a query language consisting of topic keywords combined with boolean, fuzzy, proximity and/or hierarchical operators. The topic specialist assigns a unique topic category ID, regardless of the language. Words and phrases that are part of a topic/category definition are referred to as "keywords." The topic/category definition requires that the keywords generally appear not by themselves but in particular combinations with other keywords in the same document. These keywords are combined using boolean, fuzzy, proximity and hierarchical operators to form a topic or category. Thus, these topic/category definitions are just like queries. When the proper combinations of such keywords in a document matches a category or topic, all keywords involved are replaced by the topic's ID. In such case, it will be said that a "topic event" has occurred, or that a topic was "fired". The keywords, operations and how they are structured in the query corresponding to a particular topic/category will, in general, vary from language to language, but the assigned ID will not vary.

Topic specialists and linguists create synonym lists, assign IDs to each synonym list, and create dictionaries for each language to be supported, insuring that terms with similar meaning, across different languages, have the same IDs. Therefore, for example, the category "horse racing" is specified in English using keywords such as "horse", "race", "rider" etc. and assigned a unique ID, say 58961243. When the same or another topic specialist created the same category in Spanish for "carreras de caballos," the keywords will be in Spanish, such as "caballo", "carrera", "jinete" etc., but the ID assigned to the Spanish category will be the same as the ID assigned to the same category in English, namely 58961243.

The processing commences with identification of documents as monolingual or multilingual, they are fed from a source to a language identifier which supports all required languages. The language identifier labels the documents and portions thereof with the languages in which they are written. The output of the language identifier is multiplexed into several outputs according to language, each output going into a name tokenizer specialized to handle a particular language. If, for example, the system needs to handle English, Spanish and French, the language identifier will have three outputs, one for each language. Each output will be fed into one of three different name tokenizers. Monolingual documents are processed by a single name tokenizer, the one appropriate to the language in which the document is written. A monolingual document contains one segment, only, including the whole document. A multilingual document, however, is segmented according to language, following a one-segment:one-language rule, and each segment is processed by a single name tokenizer (i.e., the one appropriate for the language in which that segment is written).

The name tokenizer executes the following tasks: replacement of all keywords involved in a topic event with a single token ID corresponding to the topic/category that was fired; replacement of all significant words/phrase with corresponding token IDs; replacement of all stop words with their corresponding token IDs; and, elimination of all other remaining characters, including numbers, punctuation marks, etc., filtered out from the name tokenizer's output stream.

The output stream of token IDs from the name tokenizer becomes the input to the stopword list filter (one for each language) which eliminates the stop word token IDs from the stream. At this point, all segments corresponding to the original document are collected by the segment consolidator filter. The output stream of topic token IDs and significant token IDs from the segment consolidator filter is the input to the vectorizer. The vectorizer converts this stream into a normalized vector representation of the original document. Each vector position (token ID) represents a topic event or a significant word match event. The score stored at that position represents the frequency and location of that topic event or significant word match event in that document, thereby indicating how closely the document matches the topic associated with that particular event.

The vector output from the vectorizer goes into a categorizer, which retrieves the list of all stored topic/query vectors that have at least one token ID in common with this new document vector. Next, the dot products of the document vectors and each of those topic vectors are calculated and stored. The resulting dot products are sorted from highest to lowest. Since all of the vectors involved (document and topic vectors) have been previously normalized to a common length (e.g., 1000), all of the resulting dot product scores can be compared with one another and sorted, in a valid manner. Each score represents how closely the original document matches the corresponding original topic/category. The document corresponding to the document vector is labelled with the topic IDs and scores of the N topic vectors that produced the highest dot product scores. In this manner, all document content has been correlated regardless of language of origin.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for categorizing documents generated in one or more languages comprising the steps of:

providing topic categories representing the terms from all of said languages for topic subject matter from documents;

assigning topic token IDs to said topic categories regardless of language of generation;

for each document to be categorized, assigning document token IDs representing the terms from all of said languages for the document subject matter, consistent with said topic categories;

replacing document content with at least one replacement document token ID for each of said topic categories; and matching topic token IDs to said at least one replacement document token ID.

2. The method of claim 1 further comprising eliminating all document information not relating to said topic categories.

3. The method of claim 1 further comprising converting said topic token IDs and said at least one document token ID into normalized vector representations and wherein said matching comprises vector processing.

4. The method of claim 3 further comprising categorizing vectors that have at least one token ID in common.

5. The method of claim 1 further comprising the steps of:

identifying documents as monolingual or multilingual; and labelling the documents and portions thereof with language identifiers for each language found therein.

6. The method of claim 5 further comprising multiplexing each of said documents into a plurality of output streams, one for each language; and filtering each of said plurality of output streams in a different language filter.

7. The method of claim 3 further comprising calculating the dot products of the document vectors, and sorting the products.

8. The method of claim 7 further comprising comparing dot products to determine how closely the document matches said topic category.

9. The method of claim 1 further comprising the steps of:

receiving at least one user query;

assigning at least one query token ID to said at least one user query; and matching said at least one document token ID to said at least one user query token ID.

10. The method of claim 9 further comprising the steps of:

converting said topic token IDs into topic vectors;

converting said at least one document token ID into at least one document vector;

converting said at least one user query token ID into at least one query vector; and wherein said matching comprises vector processing.

11. The method of claim 1 further comprising the steps of:

identifying documents as monolingual or multilingual; and labeling the documents and portions thereof with language identifiers for each language found therein.

12. The method of claim 1 further comprising multiplexing each of said documents into a plurality of output streams, one for each language; and filtering each of said plurality of output streams in a different language filter.

13. A system for categorizing documents according to topic categories, said topic categories representing the terms from more than one language for topic subject matter, said documents having been generated in one or more languages comprising:

means for identifying languages in which said documents were generated;

means for embedding language markers in said documents where said identified languages appear;

means for assigning topic token IDs to said topic categories;

means for assigning document token IDs representing the terms from more than one language for document subject matter, consistent with each of said topic categories;

means for replacing document content with at least one replacement document token ID for each of said topic categories; and a plurality of document filter means, one for each of said one or more languages, each of said plurality of document filter means being adapted to recognize said replacement document token IDs and match said topic token IDs to said at least one document token ID.

* * * * *